United States Patent [19]

Quinn

[11] Patent Number: 4,989,846
[45] Date of Patent: Feb. 5, 1991

[54] COVERED DISH CARRIER

[76] Inventor: Lucinda Quinn, 706 Glenwood Rd., Talladega, Ala. 35160

[21] Appl. No.: 520,408

[22] Filed: May 8, 1990

[51] Int. Cl.$^5$ ............................................. B23Q 01/00
[52] U.S. Cl. .................................... 260/54.5; 269/900
[58] Field of Search ........................ 269/53, 54.5, 900

[56] References Cited

U.S. PATENT DOCUMENTS

| | | | |
|---|---|---|---|
| 93,844 | 8/1869 | Sykes | 269/54.5 |
| 943,767 | 12/1909 | Bullard | 269/54.5 |
| 2,599,681 | 6/1952 | Wells | 269/54.5 |
| 2,620,003 | 12/1952 | Perdue, Jr. | 269/54.5 X |
| 2,621,807 | 12/1952 | Rendich | 269/54.5 |
| 2,751,951 | 6/1956 | Strathaus | 269/54.5 |
| 2,942,639 | 6/1960 | Margolis | 269/54.5 X |
| 3,030,994 | 4/1962 | Wysowski | 269/54.5 |
| 3,995,844 | 12/1976 | Hellman | 269/54.5 |
| 4,637,303 | 1/1987 | Lucky | 269/900 |

FOREIGN PATENT DOCUMENTS 838  2/1931  Australia ........................... 269/54.5

Primary Examiner—William I. Price
Attorney, Agent, or Firm—Dowell & Dowell

[57] ABSTRACT

A carrier for transporting covered dishes such as casseroles which includes an insulated tray, which in some embodiments may be used as a cutting board, having a plurality of holes extending partially therethrough which are oriented in patterened relationship with respect to the center of the tray and into which pins may be selectively received so as to be in substantially abutting relationship to a covered dish or other item supported on the tray.

7 Claims, 2 Drawing Sheets

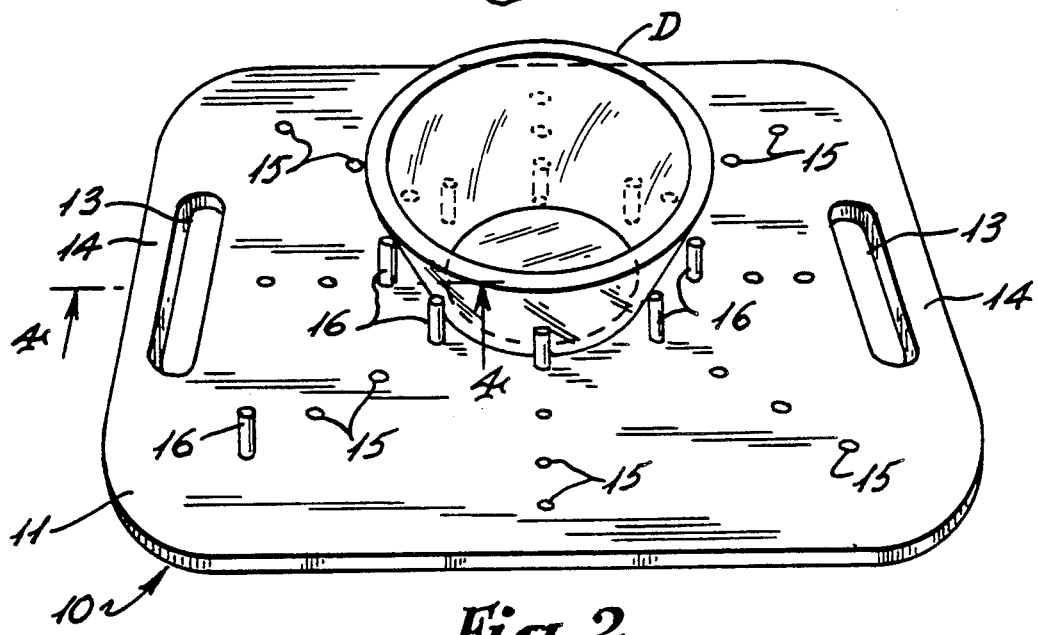
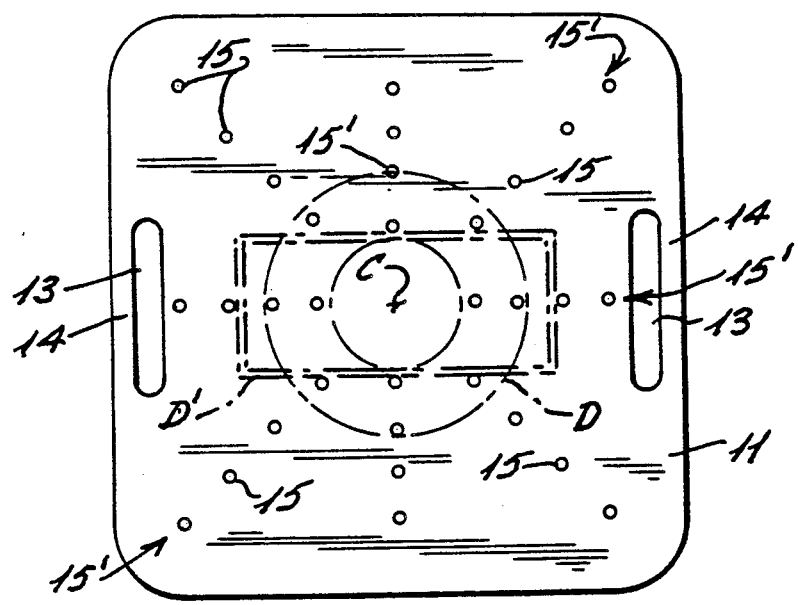
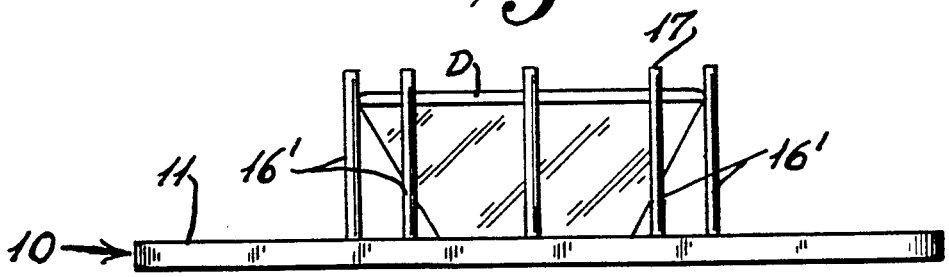

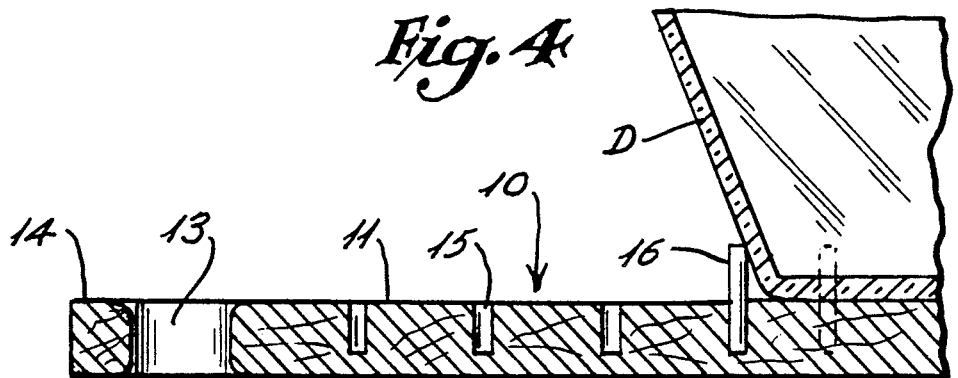
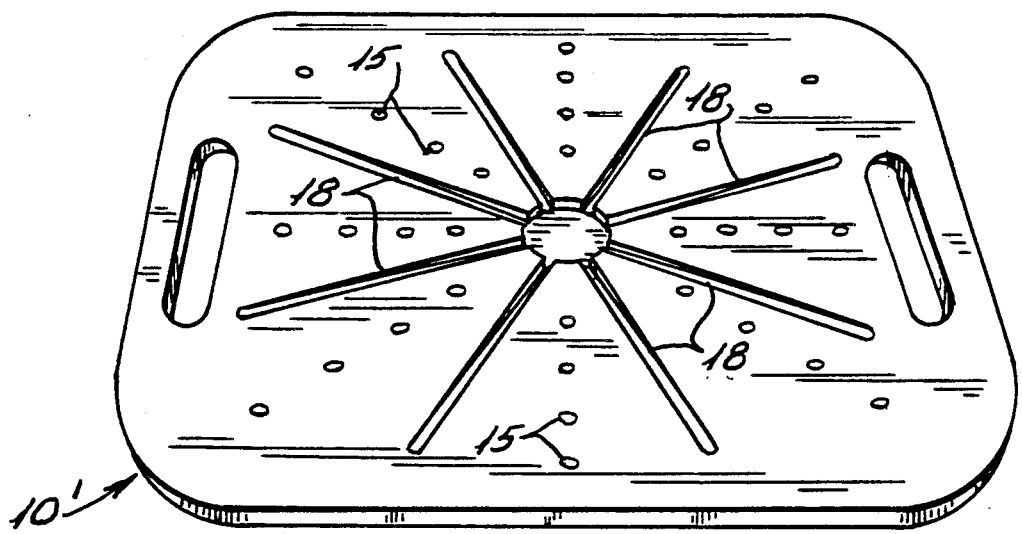
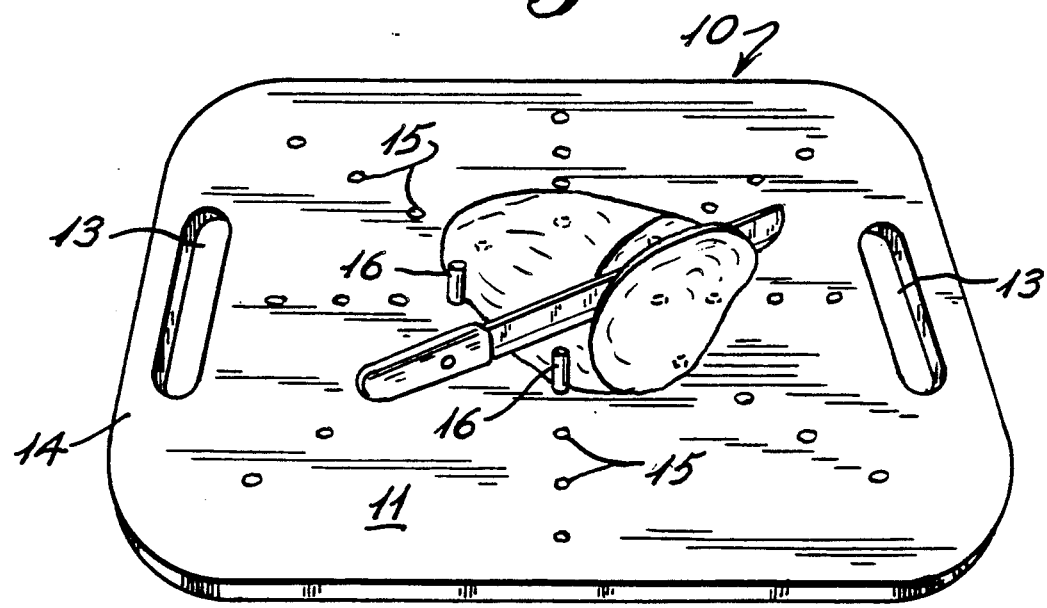

COVERED DISH CARRIER

BACKGROUND OF THE INVENTION

1. Field of the Invention

This invention is generally directed to article supports and especially to a tray which may be utilized to transport comestible product cooking or serving dishes including covered dishes, casseroles, baking pans and pots and the like and wherein the dishes are stabilized with respect to the tray by a plurality of pins which are retained within holes that are provided in the tray. The holes are in spaced and patterned relationship so that after a dish is placed on the tray the pins may be placed in substantially abutting engagement with the peripheral portions of the dish. The holes in the tray are made only partially through the thickness of the tray to thereby prevent any spilled food from passing through the tray. In addition, the tray may be provided with handles for facilitating the transport of the tray and the tray itself is preferably constructed of a heat insulating material so that hot dishes may be easily transported in a safe manner from one location to another. In a preferred embodiment, the tray is also used as a cutting board so that foods to be cut, sliced or carved may be retained on the tray by placing the pins in surrounding relationship thereto.

2. History of the Related Art

At one time or another, most people have been in a situation where it becomes necessary to transport a prepared dish such as a casserole from their home to another location such as a community or organizational meeting, church, or social supper. The problems in handling and transporting such dishes is often complicated by the fact that the dishes have been heated and thus may be hot and not safely touched. In the past, it has been necessary to carefully place such dishes on a floor mat or floor portion of an automotive vehicle or perhaps in the trunk, hatchback area or rear compartment area of a vehicle. Due to the possibility of food spillage during movement of the automobile, it is necessary to provide a protective liner between the dish and the surface area of the vehicle. Even then, once a vehicle is in motion, any frequent stops or sudden turns may result in food being spilled.

Even when transporting prepared food dishes including casseroles and the like, by hand, from one location to another, it is frequently difficult to handle such dishes especially if they have been heated, thereby necessitating that they be carried by hot pads. This type of situation is extremely awkward and can lead to accidental injury by having the contents of the dishes spill and burn the individual carrying a dish.

In view of the foregoing, it has been proposed to provide various types of carriers for dishes such as heated casseroles and the like to facilitate their transport from the place in which the food is prepared to a serving area. One type of carrier includes a cloth sack into which the dish may be placed. The sack is suspended by a cloth handle attached thereto. Unfortunately, with this type of carrier, although the individual is protected from touching a hot dish, the dish itself it not secured from movement and the contents of such a dish may be easily spilled thereby contaminating the carrier and requiring a cleaning of the dish and carrier.

In U.S. Pat. 4,637,303 to Lucky, a tray for use in an oven is disclosed which includes a metallic sheet having a plurality of spaced openings therein through which pins may be selectively inserted so as to extend both above and below the sheet. The pins may be engaged with the side of dishes or pans that are placed on the sheet so that the dishes or pans are prevented from shifting when an oven rack is pulled outwardly of or inserted into an oven. Unfortunately, such a configuration is not appropriate for use in transporting dishes including hot casseroles, pans, pots and the like from one area to another. More specifically, as the openings in the sheet extend therethrough, any accidental spills of the contents from any dishes would drain therethrough. In addition, the pins which are utilized to stabilize the dishes with respect to the surface of the sheets extend through the openings and protrude from the bottom surface thereof and therefore such sheets may not be placed upon a surface for transport, as for instance, the floor of a motor vehicle. The sheets disclosed in Lucky are designed to increase effective heat transmission and are therefore made of metallic materials whereas when transporting a heated serving dish from one location to another, it is preferred that a support be formed of a heat insulated material so that individuals and objects cannot be burned or damaged by accidentally contacting a hot surface of a prepared cooking or serving dish.

Some additional examples of prior art article retention structures are disclosed in U.S. Pat. Nos. 943,767 to Bullard and 2,621,807 to Rendich.

SUMMARY OF THE INVENTION

This invention is directed to a carrier for transporting covered dishes, such as casseroles and the like, and especially those in which heated comestible products are contained, and wherein the carrier includes a tray which is formed of a non heat conducting material having upper and lower surfaces. A plurality of holes are provided in the upper surface of the tray in generally patterned and spaced relationship with respect to one another and to the central portion of the upper surface thereof. The holes extend only partially through the thickness of the tray material so that liquids and food products cannot pass from the upper surface to the lower surface of the tray when in use. A plurality of elongated pins are provided which are of a configuration to be frictionally engaged within the holes so that the pins may be placed in substantially surrounding and abutting relationship with respect to a covered dish or casserole, baking pan or the like, which is supported on the tray.

In one embodiment, the pins which are provided are of a length so as to extend from a seated engagement within the holes to a point in spaced relationship with respect to the top of the dish which is supported by the tray so that the tops of the pins may be engaged without contacting the top or side of the dish to thereby facilitate positioning of the pins when the dish is placed on the tray. In another embodiment of the invention, the spacing of the holes in the upper surface of the tray is such that either circular or rectangularly shaped dishes may be supported by the tray and retained in position with respect thereto by the pin elements.

In another embodiment of the invention, the tray also functions as a cutting board so that food products being cut, sliced or carved may be stabilized with respect to the tray by the pins which are selectively inserted in the holes so as to be in surrounding relationship to such products.

It is a primary object of the present invention to provide a carrier for use in transporting cooking and serving dishes including casseroles, baking pans, covered dishes, soup tureens, baking pots, and the like wherein the carrier includes a heat insulated tray having pins for securing the dishes in fixed relationship with respect to the tray so that the dishes cannot be accidentally shifted or upset as the dishes are transported from one location to another.

It is another object of the present invention to provide a carrier for use in transporting food serving and cooking dishes wherein the carrier includes a tray which may include one or more indentations for collecting accidental spills to thereby prevent spilled material from passing from the surface of the tray.

It is also an object of the present invention to provide a carrier for transporting heated containers for comestible products which may be safely utilized to transport such heated containers without fear of an individual being accidentally burned by contacting the heated surface of the containers.

It is yet another object of the present invention to provide a carrier for use in transporting covered dishes, casseroles, and the like in which comestible products are contained which may be also utilized as a serving tray or a cutting board.

It is a further object of the present invention to provide a carrier for transporting covered dishes and the like which includes a tray which may also be utilized as a cutting board so that when a product which has to be cut, carved or sliced is placed on the surface of the tray the product may be stabilized relative to the board by placing several blunted pin elements in abutting relationship with the food without requiring the use of hazardous sharply pointed pins or other elements to retain the food by impaling the product.

BRIEF DESCRIPTION OF THE DRAWINGS

FIG. 1. as a perspective illustrational view of one embodiment of the present invention showing a dish being supported by the tray with the pin elements stabilizing the dish relative to the surface of the tray.

FIG. 2 is a top plan view of the embodiment of the invention shown in FIG. 1, showing a rectangular dish (in dotted line) supported on the tray.

FIG. 3 is a side elevational view of the tray and dish shown in FIG. 1 utilizing elongated peg or pin elements.

FIG. 4 is an enlarged partial cross-sectional view taken along lines 4—4 of FIG. 1 showing the holes extending into the body of the tray.

FIG. 5 is a perspective of an alternate embodiment of the invention showing channels and a central recessed area for collecting spills.

FIG. 6 is a perspective illustrational view of the tray of FIG. 1 being used as a cutting board.

DESCRIPTION OF THE PREFERRED EMBODIMENT

With continued reference to the drawings, the carrier of the present invention is shown as including a tray 10 having an upper generally flat surface 11 and lower surface 12. Although the tray is shown in the drawing figures as being generally square in configuration, it should be noted that any suitable configuration for a tray may be utilized including rectangular, oval, round or the like. As the tray of the present invention is specifically designed for the transport of hot dishes and foods, it is preferred that the tray be formed of a non-heating conducting material such as wood or plastic. As shown, the trays also include a pair of elongated openings 13 which define handles 14 at each side of the tray. If preferred, separate handles could be provided which extend vertically from the upper surface of the tray adjacent the outer edges thereof which would facilitate lifting the tray from a support surface without having to tilt or change the horizontal orientation of the tray.

The tray 10 is provided with a plurality of holes 15 therein which, as specifically shown in FIG. 4, only extend partially through the thickness of the tray material. It is noted that the holes 15 are spaced outwardly from the center C of the tray and are preferably spaced in a patterned relationship with respect to one another. In this respect, the holes 15 are shown as being arranged in radially extending rows 15' which are oriented outwardly with respect to the center of the tray. Utilizing the patterned orientation of holes, it is possible to support not only circular shaped dishes D, as shown in FIGS. 1 and 3, but also rectangular dishes D', as shown in dotted line in FIG. 2. Therefore, varying sizes and shapes of dishes may be supported on the trays of the present invention with the outer most holes being utilized when dishes of larger dimension are being supported.

Once a dish such as D or D' is placed on the upper surface of the tray and generally centered with respect to the center C thereof, a plurality of pins 16 are selectively inserted within the holes so as to be in surrounding and substantially abutting relationship with respect to the base or sidewall portions of the dishes D and D'. The pins have a cross sectional dimension which is complimentary in size with the holes 15 so that the pins will be frictionally retained within the holes. Once the pins 16 are in place, the dishes D and D' are prevented from being accidently moved relative to the upper surface 11 of the tray.

With specific reference to FIG. 3 of the drawings, in some instances it may be desirable to provide elongated pins 16' which may be inserted within the holes 15 in surrounding and substantially abutting relationship with a dish supported on the tray. The elongated pins 16' are of a dimension to extend above the upper portion of a dish D or D' so as to prevent a lid covering a dish from accidently being displaced relative to the dish. In addition, the elongated pins make it possible for the pin members 16' to be inserted within the holes 15 without the fear of accidently engaging the sidewalls of a dish which may be hot. The upper portion 17 of the pins may be easily grasped and manipulated so as to insert the pins 16' into the holes without contacting a dish supported on the tray.

With specific reference to FIG. 5 of the drawings, a second embodiment of tray 10' is disclosed. In this embodiment, the tray includes the same type of patterned holes 15 which are arranged in rows 15' extending radially outwardly from the center of the upper surface 11 of the tray. In order to collect any spills from dishes which are carried on the tray, a plurality of radially extending channels 18 may be provided which are tapered inwardly from the upper surface of the tray and towards the central portion C' thereof. A depression or recessed area is provided as shown at 20 in the area of the center C' of the tray. Any spilled liquids will be conducted by the channels 18 into the area 20.

A further unique feature of the embodiments of the present invention is that the trays may be formed of a material which is suitable for use as a cutting board.

When used as a cutting board, food items such as roasts and the like which are to be carved may be placed on the upper surface of the tray and thereafter the pin elements 16 or 16' inserted in the holes so as to surround the product. In this manner, the tray may be utilized to stabilize foods being carved without requiring the use of sharp pins such as are used in some types of conventional carving boards. Further, the pins may be selectively positioned depending upon the size and shape of the item which is to be cut or carved.

In the use of the dish carrier of the present invention, once a dish is placed on the upper surface of the tray and generally centralized with respect thereto, pin elements 16 or 16' may be inserted within the holes 15 and in abutting relationship to the dish to thereby stabilize the dish during movement of the tray.

I claim:

1. A carrier for transporting dishes comprising a tray, said tray having upper and lower surfaces, said tray being formed of a non-heat conducting material, said tray having a central portion and side portions, a plurality of holes in said tray and extending from said upper surface toward said lower surface, said holes terminating in spaced relationship from said lower surface, said holes being arranged in spaced relationship to one another so that a number of holes will be in surrounding relationship with a dish placed on said upper surface of said tray, a plurality of pin members, said pin members being selectively and frictionally seated within said holes, whereby when a dish is placed on the upper surface of said tray said pin members may be inserted within said number of holes so as to be in surrounding and generally abutting relationship thereto.

2. The carrier of claim 1 in which said holes are spaced radially outwardly with respect to the center portion of said upper surface of said tray.

3. The carrier of claim 2 including handle means adjacent said side portions of said tray.

4. The carrier of claim 2 in which the dishes have a first height, said pin members having a second height, said second height being greater than said first height when said pin members are mounted within said holes.

5. The carrier of claim 2 including a recessed area in said upper surface of said tray.

6. The carrier of claim 5 including a plurality of radially extending channels tapering inwardly from said upper surface of said tray, said channels communicating with said recessed area.

7. The carrier of claim 1 in which the dishes have a first height, said pin members having a second height, said second height being greater than said first height when said pin members are mounted within said holes.

* * * * *